Jan. 2, 1968  G. W. SMITH  3,361,386
VERTICAL OR SHORT TAKE-OFF AND LANDING AIRCRAFT
Filed Aug. 9, 1965  2 Sheets-Sheet 1
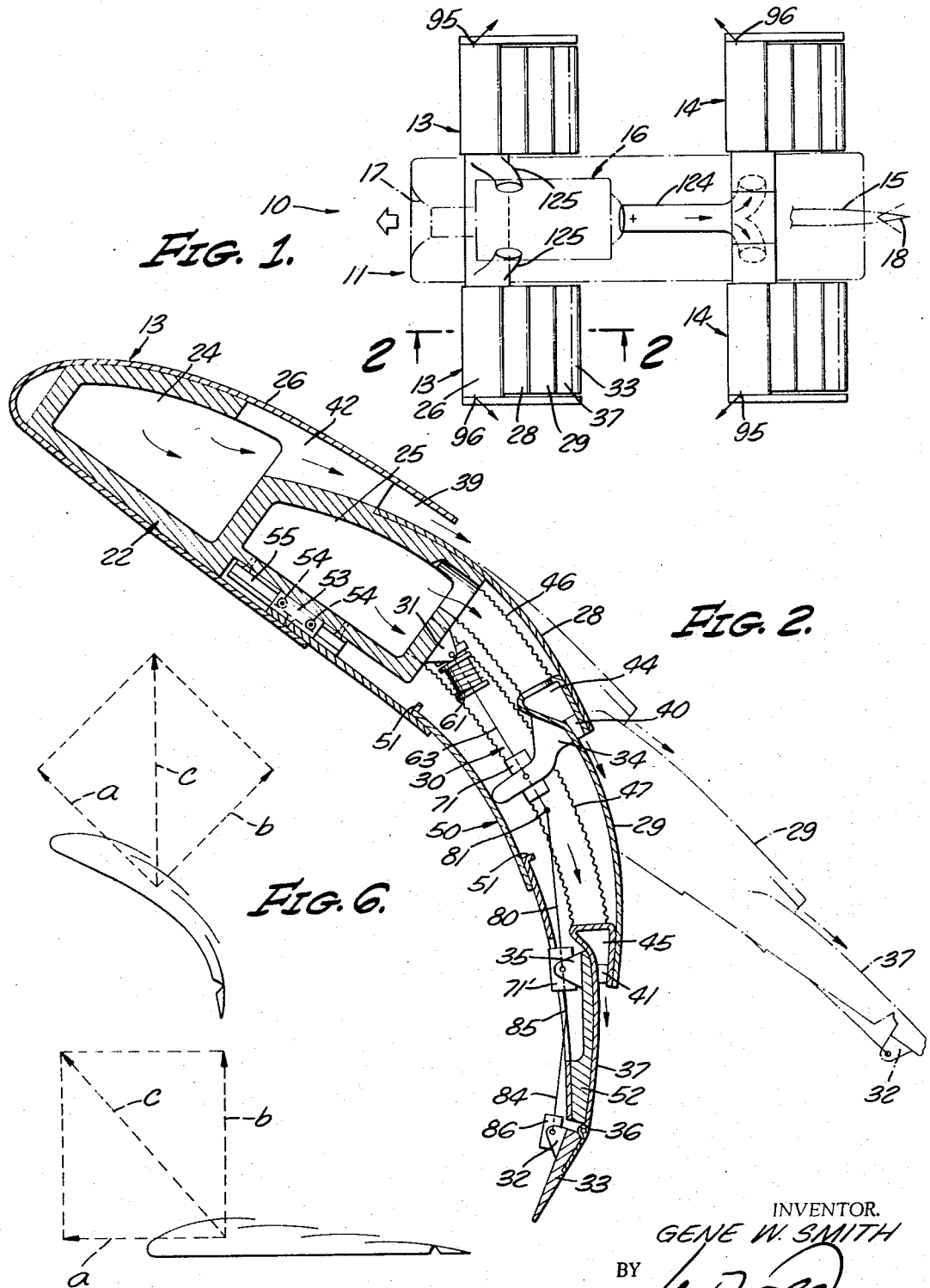
INVENTOR.
GENE W. SMITH
BY
ATTORNEY Jan. 2, 1968   G. W. SMITH   3,361,386
VERTICAL OR SHORT TAKE-OFF AND LANDING AIRCRAFT
Filed Aug. 9, 1965   2 Sheets-Sheet 2
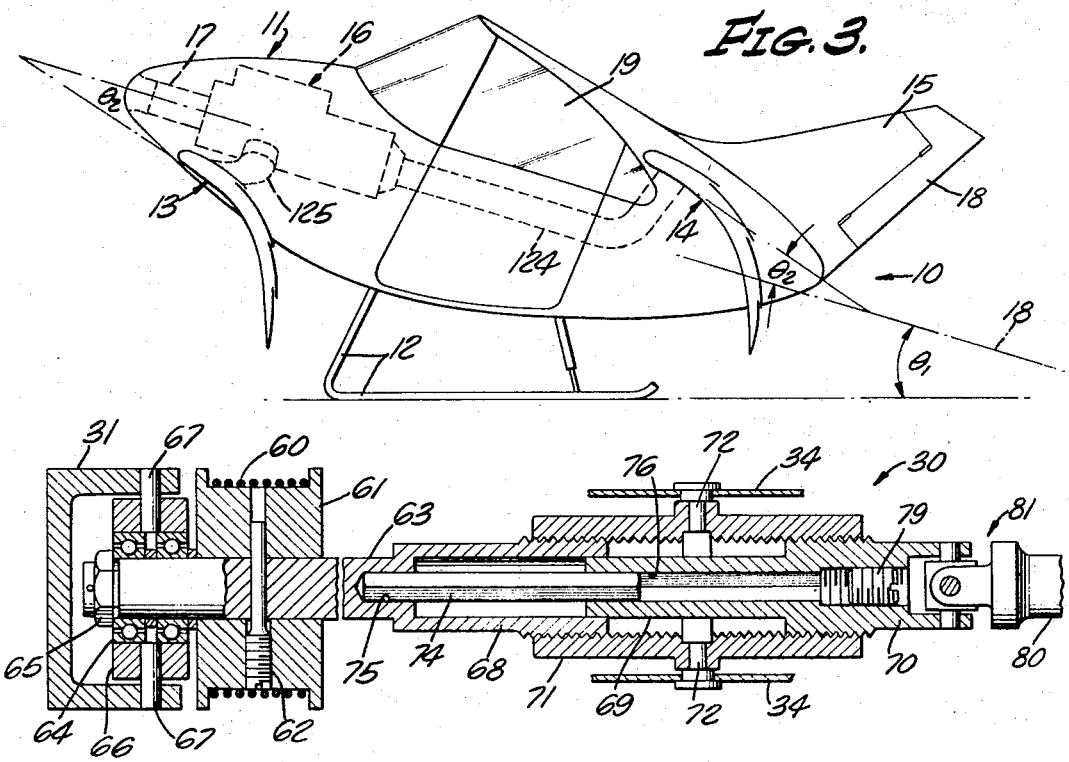
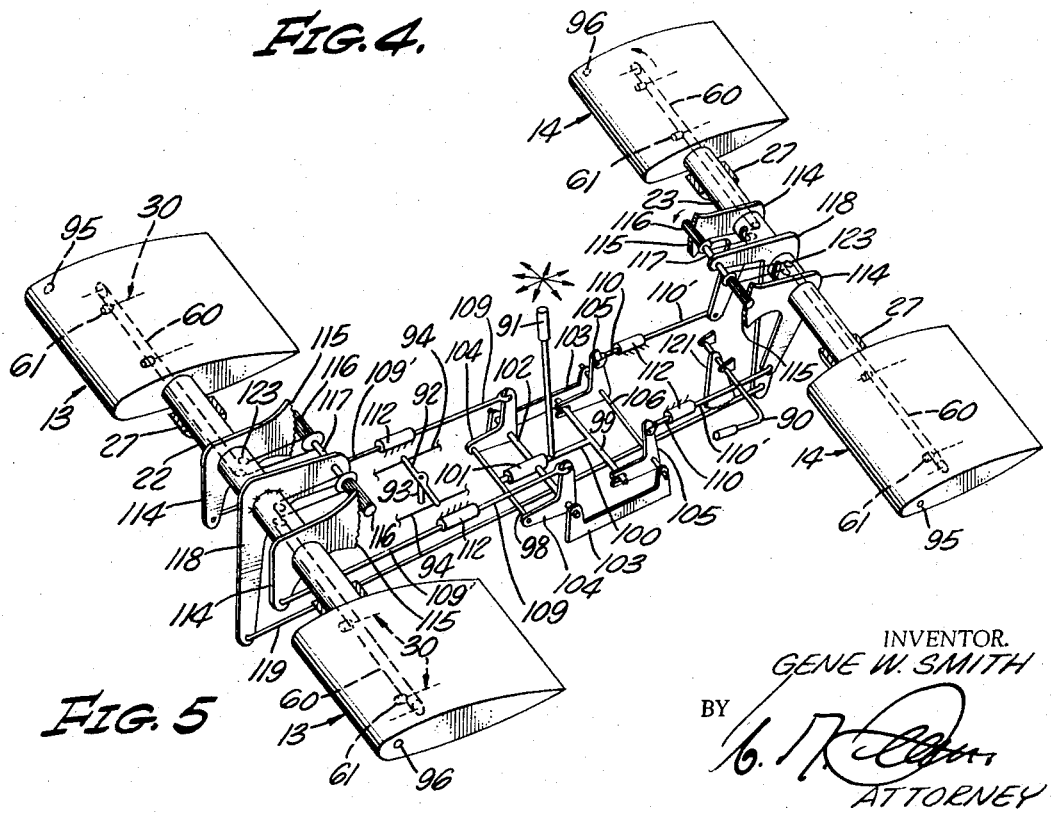
INVENTOR.
GENE W. SMITH
BY
ATTORNEY 3,361,386
VERTICAL OR SHORT TAKE-OFF AND LANDING
AIRCRAFT
Gene W. Smith, 5008 La Canada Blvd.,
La Canada, Calif. 91011
Filed Aug. 9, 1965, Ser. No. 478,205
22 Claims. (Cl. 244—12)

This invention relates to aircraft and more particularly to a unique design of a short or vertical take-off and landing craft featuring novel propulsion means and having airfoils of readily adjusted variable camber and variable angle of attack to achieve substantially vertical take-off and landing as well as flight in any forward direction and characterized by unusual stability and safety during transition between vertical and forward flight regimes. Typically the aircraft includes at least one and preferably two pairs of airfoils adjacent the fore and aft ends of the fuselage which may be either fixedly or adjustably supported depending upon whether it is desired to provide for varying the angle of attack. In either arrangement each airfoil includes provision for adjusting the camber over a wide range as well as means for jetting pressurized hot gases rearwardly across upper surfaces of the airfoils in a manner to support and propel the craft in different flight modes including vertical, horizontal and various intermediate and variant modes. In particular, the invention craft is characterized by its ability to produce high lift capability under all flight modes including the critical transition between generally vertical and generally horizontal flight modes. Other features including simple but highly effective and rugged flight control means equipped with conventional pilot control members manipulatable in a manner familiar to helicopter pilots to control the flight path of the craft and including provision for varying the camber of all airfoils selectively, differentially and collectively.

Many aircraft designs have been proposed during recent years to provide a heavier-than-air craft capable of take-off and landing in a minimum of space and having hovering as well as forward and vertical movement capabilities under widely varying speed conditions. Notable success has been achieved in the attainment of these objectives in both the auto-gyro and the helicopter but these are subject to numerous disadvantages and limitations which it is the object of the present invention to avoid. Particularly objectionable limitations of these aircraft is the fact that the main lifting force is dependent upon rotation of the airfoils and upon means for constantly changing the angle of attack of the rotating airfoils as well as upon complex dynamic balance means.

Numerous attempts have been made to retain the maneuvering and flight capabilities of rotating wing type craft while however avoiding their disadvantages. Aircraft so far developed with these objectives in mind have achieved only limited success, and are characterized by their inefficiency, complexity and their inability to transfer between vertical and forward flight regimes easily and with safety.

With the foregoing shortcomings and disadvantages of prior aircraft in mind, it is a primary object of the present invention to provide a unique aircraft having wing structures of readily variable angle of attack and camber and incorporating therein means for discharging streams of hot presesurized gas in quantities and directions to support and propel the craft in any of a large number of flight positions. Substantially all hot pressurized gas generated by the craft power plant is discharged at high velocity through slotted ports distributed throughout selected portions of the upper wing surfaces and in such manner as to augment the velocity of the relative wind as well as to produce a reaction thrust force in directions appropriate to provide the desired flight mode. The aircraft motivation and flight control provided in this manner may be applied to aircraft of widely varying aerodynamic configurations and wing dispositions.

An important feature of the invention design is an arrangement of the wing structures and of operating means for varying the camber and the angle of attack thereof utilizing control means of the same general type and mode of use long in common use in the operation and control of helicopters. Although the actual operations carried out and the functions performed by movement of the controls are quite different, still the control linkage and mechanism disclosed herein is operated in the same manner and produces the same general flight control results produced by similar movements of the related manual control members of a conventional helicopter pilot control.

In a typical illustrative embodiment of the invention disclosed hereinbelow to illustrate one manner of practicing the principles of this invention, there are provided two pairs of wing structures projecting laterally from the opposite sides of the fuselage and adjustably secured thereto along their leading edge portions by internal hollow beam structure serving additionally to distribute hot pressurized gases to the numerous slots or nozzles through which the gases are discharged rearwardly across the upper surface of the wings. Major sections of the wing structures are flexibly joined together about hinge axes extending lengthwise thereof and connected by control mechanism operable by the pilot to vary both the angle of attack and the camber of each wing as desired by the pilot. A highly important feature of the wing and motivation system for the craft is the fact that the net thrust acting on the craft can be gradually varied between that producing substantially vertical lift and that producing either forward flight, and even rearward flight. This associated control means forms part of the same control system used at all times in the flight of the craft. Operation of the controls to vary the angle of attack and the camber of the wings simultaneously and automatically changes the direction of effective thrust as well as the direction of the path of travel without any sudden or radical changes in the lifting efficiency or supporting capabilities of the wing structure. Accordingly, transition between generally vertical and horizontal flight regimes occurs safely, effectively and efficiently and employing the same controls thereafter usable to maneuver the craft in normal flight.

Another feature of the invention aircraft is the fact that the thrust-producing gases are utilized substantially in their entirety to feed the thrust-producing slots distributed over the several wing structures without need for regulating gas flow control valves. The hot gases are discharged in a laminar flow pattern distributed over a major portion of the upper wing surfaces and in such manner as to increase the velocity of the relative wind thereby further augmenting the lifting effectiveness of the wing structure. Other unique features of the wing structure include control linkage mechanism for varying the wing camber over a wide range without interference with the supply of hot gases to the thrust-producing slots and while automatically changing the angle of the slot throats in unison with changes in wing camber. The principal portion of the wing structure subjected to adjustment is rearward of the combined wing supporting beam structure and hot gas distributing system. Both the upper and lower skin members of the variable camber areas are flexible to the required degree yet so supported as to maintain desired aerodynamic shapes.

Accordingly it is a primary object of the present invention to provide an improved unique heavier-than-air vehicle having the capability of take-off and landing substantially vertically or within the confines of a short take-off facility and utilizing hot pressurized gases generated within the vehicle for lift and propulsion thereof.

Another object of the invention is the provision of an improved short take-off and landing aircraft having a novel aerodynamic configuration and featuring variable camber, nonrotating wing structures.

Another object of the invention is the provision of an aircraft having fixed wing structures of variable camber to facilitate transition between vertical and forward flight regimes.

Another object of the invention is the provision of an aircraft having fixed wing structure of variable camber and provided with a plurality of slots distributed over selected portions thereof and arranged to be supplied with hot pressurized gases effective to produce useful thrust.

Another object of the invention is the provision of a compact aircraft having a plurality of pairs of wings having an adjustable angle of attack and at least some of which are of variable camber to control the flight path.

Another object of the invention is the provision of a short take-off and landing aircraft utilizing variable camber fixed wing structures together with interconnecting control mechanism having a pair of manipulating controls adjustable to vary the flight path when manipulated as is customary for the similar controls of conventional helicopters.

Another object of the invention is the provision of an aircraft with wings having power operated means therewithin for varying the camber.

Another object of the invention is the provision of an aircraft having variable camber wings at its opposite ends.

Another object of the invention is the provision of an aircraft so designed that when flying in normal forward mode the longitudinal axis of its fuselage is tilted downwardly and forwardly.

Another object of the invention is the provision of an aircraft having wing structures projecting laterally from its fore and aft ends and provided at their outer ends with normally closed gas jetting means operable to control yaw maneuvers of the craft.

Another object of the invention is the provision of an aircraft having at least one pair of wings movably supported thereon and controllable in flight to vary the angle of attack.

Another object of the invention is the provision of an aircraft having at least one pair of wings which are adjustable in flight to vary the angle of attack and the camber thereof.

These and other more specific objects will appear upon reading the following specification and claims and upon considering in connection therewith the attached drawings to which they relate.

Referring now to the drawings in which a preferred embodiment of the invention is illustrated.

FIGURE 1 is a top plan view of the one preferred embodiment of the invention aircraft;

FIGURE 2 is a cross-sectional view on an enlarged scale taken along line 2—2 on FIGURE 1 and showing the variable camber wing when adjusted to one position in full lines and showing its normal level flight position in dot and dash lines;

FIGURE 3 is an elevational view of the aircraft resting on the ground and with the wings adjusted for generally vertical take-off;

FIGURE 4 is a fragmentary sectional view on an enlarged scale taken axially of one of the camber-adjusting linkages;

FIGURE 5 is a schematic view of the flight controls; and

FIGURES 6 and 7 are vector diagrams respectively showing the flight producing forces with the wing adjusted for vertical flight and for normal horizontal flight.

Referring initially more particularly to FIGURES 1 and 3, there is shown one preferred and typical embodiment of the invention short or vertical take-off and landing aircraft designated generally 10 and embodying the principles of the present invention. This aircraft has an elongated fuselage 11 provided along its lower side with a pair of suitable resilient shock-mounted landing skids 12 disposed to support the nose of the fuselage in an upwardly inclined position when on the ground. It will be understood that the aircraft may be supported on a suitable carriage or tricycle assembly for rolling take-off, of desired. Rotatably secured to and projecting laterally from the opposite sides of the fore and aft ends of fuselage 11 are pairs of wing structures 13, 13, and 14, 14. As hereinshown by way of example, the forward pair of wings 13 is spaced vertically below the rear pair 14, it being pointed out that this vertical spacing increases when the aircraft is in normal level flight since, in the normal forward flight mode of the craft, its nose is pointed slightly downwardly and the angle of attack of the wings is relatively small. The rear end of the fuselage is provided with a vertical stabilizer 15 having a generally conventional rudder. Housed within the fuselage is a hot gas generating device of any suitable construction, as a turbo jet engine 16 having one or more air intakes, such as that indicated at 17. The pilot and passenger compartment 19 is located generally centrally of the fuselage.

FIGURE 3 clearly shows the fore and aft pairs of wings or airfoils as vertically offset from the opposite sides of the longitudinal center line 18 of the fuselage. Center line 18 has been extended beyond the rear of the craft and intersects the ground line at an angle $\theta_1$. As here shown, this angle is substantially greater than the angle of attack $\theta_2$ of the several airfoils as illustrated in FIGURE 3 there shown adjusted in readiness for take-off.

Referring to FIGURE 5, it will be understood that both pairs of wing structures 13, 13 and 14, 14 are rigidly connected to one another by a suitable beam means including the high strength tubes 22, 23 both of which are pivotable through small arcs in suitable journals 27 fixed to the fuselage. These journals are not illustrated since the structural details are of no importance and not a part of the invention. The portions of these rigid beam structures interiorly of the wings proper may have the cross-section shown in FIGURE 2 wherein they are shown as divided into a pair of generally parallel gas distributing ducts 24, and 25. Furthermore it is pointed out that each beam is preferably exteriorly contoured as shown to provide direct support for fairing 26 external of suitable aerodynamic contour lengthwise of the leading edge of the wing. This fairing may be secured to beam 22 and the other associated structures in any suitable manner.

The combined wing beam and gas distributing duct 22 as herein shown occupies approximately the forward one-third of the wing. The remaining trailing two-thirds of the wing structure is extremely flexible chordwise of the airfoil to the end that the wing camber may be varied in any degree between the normal level flight configuration shown in FIGURES 5 and 7 and the downwardly curled configuration shown in full lines in FIGURES 2 and 6. To this end, the trailing portion of the wing is supported in major part by the cooperating action of the flexible sheets 28, 29 extending lengthwise of the upper surface of the wing and an adjustable linkage mechanism, designated generally 30, having one end pivotally supported by bracket 31 and its outermost end connected to a bracket 32 integral with the trailing lip or aileron 33 of the wing. Intermediate portions of the adjustable linkage 30 are pivotally socketed to a bracket 34 rigidly secured to the trailing edge of flexible skin sheet 28 and to another bracket 35 rigidly secured to the trailing edge of the upper flexible skin member 29. The outer end of the linkage is connected to aileron 33 which is pivotally connected by hinge 36 to the adjacent skin member 37 of the upper wing surface. Linkage mechanism 30 is so made, as will be described presently, that it can be extendible or contractable lengthwise thereof as desired by the pilot to hold the wing outstretched in its normal configuration or curled to the position shown in full lines in FIGURE 2.

Before proceeding with the description of the camber control linkage 30, it is desired to point out that the upper skin members 26, 28, 29 and 37 of the wing structures overlap one another shingle-fashion with the trailing edge of one skin sheet overlapping and spaced vertically slightly above the advance edge of the next trailing skin member. The vertical spacing between these overlapped edges is important and includes provision for long low-height orifices extending substantially the full length of the wings and through which the hot pressurized gases issue to impart flight thrust to the aircraft. Such orifices are indicated at 39, 40 and 41, it being pointed out that the discharge axis of each is rearward and spaced closely against the upper surface of the downstream cover sheet of the wing or airfoil. Jet orifice 39 communicates through passages 42 with the foremost gas distributing duct 24, whereas jet orifices 40 and 41 open into distributing channels 44 and 45 supplied with hot pressurized gas through flexible ducts 46 and 47 in communication with the main gas distributing duct 25.

The lower side of the wing structures are likewise formed of flexible skin 50 here illustrated as formed in a number of individual overlapping strips rigidly secured together adjacent the upturned lips 51 extending inwardly and serving to reinforce and stiffen these strips adjacent their points of overlap. The trailing edge of sheet 50 is secured to a stiffening member 52 underlying and secured to the upper skin sheet 37. The forward or advance edge of skin 50 is secured to pairs of bracket members 53 cooperating to support rollers 54 having rolling engagement with the channels of an I-beam 55 rigidly secured to the underside of duct 25 of wing beam 22. It will be understood that brackets 53 and the rollers 54, 54 are guided to and fro along the trackway provided by I-beams 55 to accommodate the movement of skin sheet 50 as this sheet moves between its curled position shown in FIGURE 2, and its normal outstretched position shown in FIGURES 1 and 7. It will therefore be recognized that the flexible rolling support so provided for the leading edge of sheet 50 provides a high strength lost-motion connection between skin 50 and fairing skin 26 covering the leading edge of the wing. Additional support for skin 50 is provided by components of linkage 30 such as by the extended rounded lower ends of brackets 34 (FIGURE 2).

Desirably the flexible skin members 28, 29, 37 and 50 are taper-milled in accordance with well known technique by those skilled in the airfoil construction art. This mode of construction provides high strength and a convenient manner of obtaining controlled flexure of the wing as its camber is adjusted by linkages 30 now to be described.

Referring now more particularly to FIGURES 4 and 2, it will be understood that the camber control linkages 30 extend chordwise of the wing structures and are suitably spaced from one another along each wing. Only two linkage mechanisms are shown in each wing in FIGURE 5, but it is pointed out that any appropriate number may be provided and connected in series with one another along the operating cable 60. This cable has several turns snugly encircling each of spools 61 to provide high load driving contact with the surface of these spools. Spools 61 are keyed to one end of each linkage 30, as by a threaded locking stud 62 (FIGURE 4) which extends through an opening in the forward end of the rod-like adjusting link 63. The forward end of this link is held rotatably secured to thrust bearings 64 by a locknut 65. The mounting ring 66 for these bearings has a pair of diametrically opposed trunnion members 67 the outer ends of which are journalled gimbal-fashion in a cup-like mounting bracket 31 suitably secured to the rear face of the wing beam member 22, as is best shown in FIGURE 2.

The opposite or rearwardly facing end of link 63 is formed with an externally threaded axial socket 68 having a sliding fit with the circular stem 69 of a second externally threaded member 70. The threads on members 68 and 70 are of different pitch and mate with the similarly pitched ball screw threads of a jack nut 71. This nut has trunnions 72 projecting from its opposite sides journalled in a bracket 34 secured to the junction of upper skin members 28, 29. A noncircular coupling rod 74, here illustrated as of square cross-section has its forward end fixedly seated in a well 75 of rod 63 and its other rear end slidably seated in a similar noncircular bore 76 of member 70. It will therefore be evident that member 74 can transmit rotary movement between members 63 and 70 while permitting these two members to move axially toward and away from one another while members 68 and 69 are rotating relative to the non-rotating jack nut 71. In other words, the clockwise rotation of member 63 acts to impart clockwise rotary movement to member 70 but, owing to the differently pitched threads on these two members, there is relative axial movement between members 63 and 70 which is readily accommodated by the sliding junction between the noncircular drive member 74 and bore 76 in member 70. The outer end of bore 76 is normally closed by a threaded cap 79 which serves to hold a charge of suitable lubricant captive therein.

The right-hand end of member 70, as viewed in FIGURE 4, is connected to the adjacent end of the next link member 80 through a suitable universal joint 81. It will be understood that the remote or opposite end of link member 80 is threadedly coupled to a jack nut 71' identical in construction with ball screw nut 71 described above. It will likewise be understood that nut 71' is similarly journalled in bracket 35 by trunnions similar to trunnions 72 of nut 71, and that the oppositely pitched threads of sleeve 71' are coupled through a universal joint 85 with a final control link 84. Rod 84, as rods 63 and 80, has a threaded rotating connection with an outboard ball screw jack nut 86 pivotally supported in bracket 32 of the rear aileron 33.

Referring now more particularly to FIGURE 5, there is shown an operating control system or linkage for operating the camber control linkages 30, 30 of the several wings, either in unison or differentially. This control system also includes rudder control means for operating yaw control values. This control linkage system has three manually operated controls including a collective operating lever 90 effective to adjust both the angle of attack and the camber of all airfoils simultaneously, a differential pitch and roll control 91 effective as a camber trim control, and a foot-operated yaw control 92. Control 92 is conveniently positioned for operation by the pilot's feet and rotates about a generally upright axis shaft 93. This rudder control is suitably connected, as by cables 94 to rudder 18 and to valves supplying pressurized gas to the pairs of nozzles 95, 95 at the outer ends of the wings. It will be understood that normally rudder control 92 is in a neutral position in which event rudder 18 is in neutral position and all gas flow to the nozzles is cut off. If the rudder control is pushed with the right foot, cables 94 operate to pivot rudder 18 to the right and to open the valves controlling the flow of the diagonally disposed jets 96 which have their orifices directed as indicated in FIGURE 1 so that the reaction forces operate to cause the craft to veer to the right, whereas pushing the rudder control with the left foot pivots rudder 18 to the left and supplies gas to the other pair of nozzles 95, 95 thereby causing the craft to veer to the left.

The pitch and roll control stick 91 is universally supported for selective movement to and fro lengthwise of the crack, transversely to the right or to the left, and in any intermediate direction. The mounting providing for these paths of movement and for imparting appropriate movement to the camber control linkages 30 includes the control stick 91 proper and the several operating connections now to be described. Control 91 projects upwardly from the center of an H-shaped member comprising a pair of parallel rods 98, 99 rigidly connected by a cross bar 100 extending lengthwise of the craft fuselage. This cross bar is journaled in a bearing 101 rigidly secured to trunnions 102, 102 journaled at their outer ends in brackets 103, 103 fixed to the sides of the fuselage.

The outer ends of the rigidly interconnected shafts 98, 99 are loosely journaled in the horizontal legs, respectively, of bell cranks 104 and 105. The mid-portions of cranks 104 are loosely journaled on trunnions 102 and the mid-portions of cranks 105 are similarly journaled on a shaft 106 having its ends carried by brackets 103, 103. The vertical legs of the pairs of bell cranks 104, 105 have operating connections with push-pull rods 109, 110, respectively, extending longitudinally of the fuselage and connected to fore and aft conventional-type hydraulic servo actuators or boosters 112, 112 suitably anchored to the craft frame. Push-pull output rods 109', 110' projecting from the remote ends of these boosters have operating connections with the lower ends of bell cranks 114, 114 journaled on the cylindrical portions of the rigid wing beams 22, 23. The arcuate ends of the horizontal legs of these cranks are provided with gear teeth 115 meshing with pinion gears 116 journaled on the outer end of a shaft 117 having its mid-length fixed to the horizontal leg of a bell crank 118 welded or otherwise fixed to the tubular beam structures 22, 23. The lower ends of the vertical legs of bell cranks 118, 118 are interconnected by push-pull rod 119 having rack teeth normally held in mesh with the teeth on the rim of a sector 121 fixed to and rotatable with the collective control stick 90. If the collective control stick is held stationary, then bell cranks 118 are anchored against rotation and movement of the pitch and roll control stick 91 operates through bell cranks 114 to rotate pinions 116.

Anchored to the pinions 116, 116 are pulleys each supporting a separate endless cable loop 60. This loop passes over pulleys 123 suitably supported within tubular beam 22 with one rim portion lying close to and generally parallel to the axis of rotation of bell crank 118. One run of these cables has portions thereof wrapped several times around each of the spools 61 (FIGURE 4) employed to operate an associated one of the camber control linkages 30 in the wing structures. Desirably, the outer end of each cable loop passes over a pulley mounted near the outer end of the wing structure having a spring-biased bearing support operating to maintain cable 60 under continuous tension. It will be understood that each pinion 116 is employed to operate its own endless cable leading to the several camber adjusting linkages in each wing structure.

Although the embodiment described above utilizes airfoils or wings having an adjustable angle of attack, it will be understood that, if desired, either or both sets of airfoils may be fixed to the fuselage with a fixed and predetermined angle of attack. In this event, bell crank 118 associated with the fixed airfoils is not welded or otherwise secured to the tubular beam member but instead is free to rotate thereabout. Accordingly, swinging movement of bell crank 118 while the adjacent bell cranks 114 are held stationary is effective to shift pinions 116, 116 along sector teeth 115 thereby causing pinions 116 to rotate and adjust the camber of the airfoil connected therewith.

Operation

The operation of the short take-off and/or vertical landing aircraft hereinabove described will be quite apparent from the foregoing detailed description of a typical embodiment of the principles of this invention and will be further facilitated by reference to FIGURES 6 and 7. The latter figures are force-direct vector diagrams showing the principal components and the general direction of the thrust forces acting under the two extreme camber adjustments of the wings.

At take-off the plane is resting on skids 12 in the general position shown in FIGURE 3 and, as herein shown, collective control stick 90 is then rotated upwardly from its neutral level-flight position. This rotation of stick 90 upwardly occurred during the previous landing operation about its own bearing axis which will be understood as extending crosswise of the fuselage. This upward movement shifted rod 119 to the left as viewed in FIGURE 5 and rotated both the forward and rear bell cranks 118 and wing beams 22, 23 clockwise. Since control stick 91 is being held stationary the forward pinion carrying shaft 117 is moved bodily downward while the rearward pinion shaft 117 is moved upwardly along sector teeth 115. This movement of the two shafts is effective to rotate both pairs of pinions on these shafts clockwise as viewed in FIGURE 5 thereby simultaneously driving each of the four control cables 60, 60 in the same direction and simultaneously contracting each of the linkages 30 in a manner to adjust the camber of each of the wings to the curled position shown in FIGURES 2 and 3. As was mentioned above, the upward movement of collective stick 90 from its neutral position not only adjusts and increases the wing camber but it also simultaneously increases the angle of attack by rotating the wings in unison and through a small clockwise direction, as viewed in FIGURE 5, thereby materially increasing the vertical lifting performance of the wings. Desirably, the handgrip for the collective stick 90 is rotatable about the axis of the stick and arranged to operate suitable fuel controls for the gas generator 16. Such fuel controls are well known to those skilled in aircraft control and for that reason need not be shown.

After the wings have been adjusted as described, the fuel supply and speed of the gas generator is increased by rotating the handgrip on stick 90 thereby greatly increasing the supply of hot pressurized gas produced by generator 16. Part of this gas is conveyed through ducting 124 (FIGURE 1) extending rearwardly through the fuselage and is divided equally between ducts 24 and 25 of each rear wing structure. Similar quantities of hot pressurized gas are simultaneously conducted from the gas generator through ducts 125 (FIGURE 1) into ducts 24 and 25 of each of the forward wing structures 13, 13. The hot pressurized gas is then distributed rearwardly through each of the long low-height jetting nozzles 39, 40 and 41 (FIGURE 2), passes at high velocity and in thin sheets along paths closely overlying areas of the upper surfaces of the wing immediately rearward of each of these nozzles.

Since at take-off the wings are curved downwardly, the reaction forces at each of the jetting nozzles is directly opposite the direction of flow, it will be apparent that the resultant of the reaction forces from the several nozzles is upwardly and forwardly and represented generally by vector $a$ in FIGURE 6. In addition, the rapidly flowing streams of air overlying the upper surfaces of the wings rearwardly of the nozzles creates low pressure areas between these jets and the wing surface with the result that the atmospheric pressure acting on the underside of the wing surface at 50 has a resultant represented by vector $b$ in FIGURE 6. The resultant of vectors $a$ and $b$ is represented by vector $c$ which, as will be readily apparent, lies in a generally vertical plane. These resultant thrust forces acting on all four wings simultaneously mutually cooperate to lift the plane from the ground. As this occurs, the pilot continues to maintain the gas generator in operation near its high or maximum output and maintains the wing camber and angle of attack adjustment close to maximum until the craft has been lifted to an appropriate altitude for transition into horizontal flight regime.

When at a safe height and in a proper position, the pilot may shift gradually or rapidly, as desired, to a forward horizontal flight regime merely by lowering collective stick 90 to its neutral position thereby reversing the rotation of pinions 116 and cables 60. Bell cranks 118 are rotated through a small counterclockwise arc to decrease the angle of attack and control cables 60 then operate to lengthen the camber operating linkages 30 thereby straightening the camber of the wing towards its normal flattened flying profile. As this occurs, the flow direction of the hot gases discharging from the wing slots gradually changes thereby producing a corresponding change in the direction of the resultant vector $c$ from the position shown at take-off, illustrated in FIGURE 6, to the position represented diagrammatically in FIGURE 7. Of particular importance is the fact that the transition between the vertical and horizontal flight regimes occurs gradually and while the high velocity gases issuing from the wing slots remain at full efficiency and effectiveness to produce flight thrust. This fact is readily apparent from a consideration of FIGURES 6 and 7 showing how resultant vector $c$ is constantly present and merely shifts between generally upright position and a forwardly and upwardly inclined position.

The flight of the craft is controlled easily and readily after take-off and transition in a generally conventional manner and as the pilot uses the throttle control in combination with collective stick 90, and the pitch and roll control stick 91, and yaw control 92. Before proceeding to describe the operation of these controls, it should be pointed out that in level flight operation the nose of the craft is normally pointed downwardly and forwardly, this being the natural and proper design attitude of the described craft. This is due to the angle of attack of the two sets of wings and the fact that, as herein illustrated and described, the fore and aft sets of wings 13 and 14 are located at different elevations by a distance equal to the perpendicular distance between the general planes of their lower surfaces of the two sets of wings when adjusted for horizontal flight. This disposition of the wing sets has several advantages including the important fact that the relative flow over the forward wings is at a different level than that occurring over the rear set. Accordingly, any turbulence occurring in the relative air flowing over the forward set does not interfere with the high efficiency of the relative wind over the rear wing set.

Yaw movements of the craft about its vertical axis occurs under the control of the pilot's foot-operated control 92. Pressing on this control with the right foot causes the craft to turn to the right by pivoting rudder 18 to the right and causing hot gas to be jetted from the diagonally situated pair of nozzles 96 in the wing tips. Likewise, pressing control 92 with the left foot causes the craft to veer to the left by pivoting rudder 18 to the left and opening the other set of gas nozzles 95, 95 in a pilot-controlled degree.

Normally, yaw movements will be accomplished by differential adjustment of the wing cambers using control stick 91. Thus, in a yaw turn to the right, the pilot presses control 92 with his right foot while shifting control stick 91 diagonally forward and to the right from its neutral position. This movement of the control stick pivots the rigid H-shaped units 98, 99, 100 counterclockwise about the axis of shaft 102 while simultaneously rotating the entire H-shaped unit to the right about the axis of cross-bar 100 and its supporting bearing 101. This componud movement of the H-unit produces resultant movements in the several push-pull rods which are dependent on whether the major movement of stick 91 is longitudinally or laterally of the craft. One pair of diagonally related bell cranks is rotated in opposite directions in a degree aided by both the longitudinal and the lateral components of the stick movement whereas these components tend to cancel one another as respects the movement of the other pair of bell cranks in opposite directions. In consequence, and in executing a right turn, for example, the right front crank 104 is rotated counterclockwise, and the left rear crank 105 clockwise rotated only slightly because of the canceling effect of the compound movement of stick 91 just referred to. In consequence, it will be understood that this differential movement of the two pairs of diagonally arranged bell cranks operates through the described operating connections to decrease the camber of the right front wing relative to the camber of the other three wings, the camber of the rear wings being increased to a greater degree than the camber of the left front wing. This causes the plane to pitch downwardly and to the right. Since, under the conditions here assumed, the pilot is holding collective control 90 in its neutral position, no change occurs in the angle of attack adjustment of any wing, all wings now being held against rotation about the axes of beams 22, 23 by reason of the stationary connections between these beams and control stick 90.

From the foregoing description of the operating effect produced by a single diagonal movement of differential control 91, the effect produced by movement in any other diagonal direction will be readily understood. Likewise, it will be apparent that movement of stick 91 longitudinally of the craft decreases the camber of the wings at one end while increasing the camber of the wings at the other end thereby determining the direction and degree of pitch movement. Similarly, lateral movement only of stick 91 increases or decrease the camber of both wings on one side of the plane while oppositely varying the camber of both wings on the other side of the craft to control pure roll movement.

Hovering is accomplished by use of the collective stick to increase the downward camber of all wings simultaneously while rotating the fuel control to the gas generator to suitably adjust the pressure and quantity of hot gases delivered to wing slots. When a proper adjustment is made, the hot gases discharging from the generally downwardly directed wing slots and the differential pressures acting on the wing surfaces will be adequate to support the aircraft in a generally stationary position with substantially no movement in either a vertical or a horizontal direction.

The basic control and operational sequence employed for transition from forward flight to hover and vertical landing of the vehicle is accomplished by reducing engine throttle setting thereby slowing the vehicle and simultaneously and collectively beginning to increase the camber of the wings by an upward movement of control 90. As the airfoil sections are increased in curvature the aerodynamic drag of the aircraft increases further reducing the vehicle forward speed. With the increase wing camber and resultant decrease in forward speed the aircraft gradually assumes an increasingly nose-up attitude as the pilot pulls rearwardly on stick 91 to increase the camber of the front wings and decreasing the camber of the rear wings. The aircraft ultimately assumes the attitude and configuration generally shown by FIGURE 3, whereupon by continued closing of the throttle and trimming adjustment by means of differential control 91, the craft may be landed along a substantially vertical path.

While the particular vertical or short take-off and landing aircraft herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A VTOL aircraft having a main body provided with an airfoil structure projecting laterally from the opposite sides thereof and including means for adjustably supporting the same about an axis extending lengthwise of the respective airfoil structures to vary the angle of attack and the performance of said aircraft while airborne, said airfoil structures having means for discharging a plurality of jets of pressurized gas rearwardly across the upper surfaces thereof in their differently adjusted positions, means for supplying pressurized gas to said airfoil structures, and means for simultaneously adjusting the camber of said airfoil structures and the direction of gas discharge from said jets to vary the direction of effective thrust produced by the discharge of pressurized gas from said airfoil structures.

2. A VTOL aircraft having a main body having an adjustable camber airfoil structure projecting laterally from the opposite sides thereof, said airfoil structures having means for discharging a plurality of jets of gas rearwardly across the upper surfaces thereof in their differently adjusted positions, means for supplying gas to said gas jetting means, means for simultaneously adjusting the camber of said airfoil structures and the direction of gas discharged from said jetting means to vary the direction of effective thrust produced by the discharge of gas jets therefrom, said airfoil structures including a plurality of chord sections flexibly and adjustably connected together generally parallel to one another and to trailing and leading edges of said airfoil structures, means for rigidly supporting the leading edge of said airfoil structures while leaving the remaining major portions free for adjustment of the camber between a relatively shallow camber and a deep downwardly curling camber effective to provide a powerful upward thrust to the aircraft as pressurized gas discharges from the jets along the upper surface of said airfoil structures.

3. A VTOL aircraft as defined in claim 2 characterized in that said camber adjusting means includes pilot-controlled means for selectively adjusting the camber of the airfoil on the opposite sides of said aircraft.

4. A VTOL aircraft as defined in claim 1 characterized in the provision of separate pairs of said adjustable camber airfoil structures adjacent the fore and aft ends of the aircraft each having means for discharging pressurized gas rearwardly across the upper surfaces thereof.

5. A VTOL aircraft as defined in claim 4 characterized in that said pairs of airfoil structures are arranged in vertically offset planes during normal forward flight whereby the slipstream from the forward pair of airfoils does not encounter and flow across the rear pair of airfoil structures.

6. A VTOL aircraft having an elongated fuselage housing means for generating pressurized gas, pairs of adjustable-camber functionally-independent airfoils carried by said main body and projecting laterally from the sides thereof adjacent its fore and aft ends and controllable to support said fuselage with its leading end depressed during normal forward flight with said fore and aft pairs of airfoils at different levels to isolate airflow over the fore airfoils from that occurring over the aft airfoils, and means for supplying gas from said generating means and discharging the same rearwardly over the upper surfaces of said airfoils.

7. A VTOL aircraft as defined in claim 6 characterized in the provision of pilot-manipulated control means for adjusting the camber of each of said airfoils at will and effective to shift between generally vertical and generally horizontal flight modes smoothly and without substantial change in the stability of the aircraft during the transition operation.

8. A VTOL aircraft as defined in claim 6 characterized in the provision of operator-controlled pitch and roll control means having operating connections to camber adjusting means carried by each of said airfoils, and operator-controlled collective control means for varying the camber of said airfoils in unison.

9. A heavier-than-air aircraft having an aerodynamically contoured fuselage equipped on either side with fore and aft pairs of wing structures arranged to operate in separate and independent slipstreams, means carried by said wing structures for jetting thrust-producing hot pressurized gas over the upper surface of each wing structure and toward the trailing edge thereof to aid in propelling said aircraft, and means for varying the axis of said gas jetting means relative to the leading edges of said wing structures to vary the axis of effective thrust thereby to vary the flight path of the aircraft.

10. An aircraft as defined in claim 9 characterized in the provision of means extending along and interiorly of said wing structures for feeding pressurized hot gas to said gas jetting means.

11. An aircraft as defined in claim 6 characterized in that said wing structures include hollow rigid beam means extending lengthwise of the leading edges thereof and ported to conduct hot pressurized gas to said gas jetting means.

12. An aircraft as defined in claim 11 characterized in that said gas jetting means extend lengthwise of the upper portion of said wing structures and discharge rearwardly along paths closely spaced from the upper surfaces thereof to thrust said aircraft in a desired direction of travel.

13. An aircraft as defined in claim 9 characterized in that said fuselage is elongated and provided with a pair of wing structures projecting laterally from the opposite sides thereof with one pair adjacent the forward end and the other pair adjacent the rear end thereof, said wing structures being adjustable to vary the camber thereof and thereby the direction of the path of travel.

14. An aircraft as defined in claim 13 characterized in that said pairs of wing structures are positioned to have the medial plane through the chords thereof disposed in generally parallel but spaced apart planes when said aircraft is in generally normal level forward flight.

15. An airfoil as defined in claim 1 characterized in that said camber adjusting means includes a plurality of links arranged end-to-end and having their adjacent ends connected together by universal coupling means, and at least certain of said links being formed in two halves drivingly interconnected with each other, and nonrotating nut means having differently pitched threads connecting said link halves together.

16. An airfoil as defined in claim 15 characterized in the provision of reversible power means for rotating the links of said camber adjusting means in either direction to lengthen and to shorten the overall length thereof depending upon the direction of rotation of said reversible power means.

17. A camber adjusting linkage assembly for an airfoil structure, said linkage comprising a plurality of rigid power transmitting links arranged end-to-end, universal coupling means interconnecting the adjacent ends of said links, at least one of said links having two halves arranged end-to-end and rotatably interconnected by a nonrotating nut formed with differently pitched threads mating with similarly pitched threads on the respective ones of said link halves, means pivotally supporting said nut on an axis extending diametrically thereof, means movably interconnecting the adjacent ends of said link halves for causing both halves to rotate in unison, and means for rotating said links selectively in either direction.

18. A camber adjusting linkage assembly as defined in claim 17 characterized in the provision of means adapted for use in coupling one end of said assembly to an airfoil structure adjacent the leading edge portion thereof, and means adapted for use in coupling said nuts to spaced apart points in the trailing edge portion of a variable camber airfoil.

19. In a VTOL aircraft of the type having a plurality of variable camber airfoils provided with a plurality of thrust producing gas jetting nozzles distributed over the upper surfaces thereof and discharging rearwardly over the trailing edges of said airfoils, a control system for regulating the camber of said airfoils, said control system including a universally movable differential control member operable to vary the camber of said airfoils and effective to regulate pitch and roll of the aircraft, and a second manually operated collective control member operable to regulate the camber of all airfoils simultaneously and in the same direction and degree.

20. A VTOL aircraft control system as defined in claim 19 characterized in the provision of foot operated means for jetting pressurized gas from the outer ends of said airfoils and in directions to regulate yaw movements of said aircraft about a generally upright axis.

21. A VTOL aircraft as defined in claim 1 characterized in that said means for adjusting the angle of attack of said airfoil structure and said means for adjusting the camber of said airfoil structure are interconnected for simultaneous operation.

22. A VTOL aircraft as defined in claim 21 characterized in the provision of separate pilot operated means connected with said camber adjusting means and operable to vary the camber of said airfoil structure while retaining the angle of attack of said airfoil structure in any one of numerous adjusted positions.

References Cited

UNITED STATES PATENTS

| | | | |
|---|---|---|---|
| 1,845,307 | 2/1932 | Maxwell | 244—7 |
| 2,348,253 | 5/1944 | Griswold | 244—42 |
| 2,406,918 | 9/1946 | Stalker | 244—43 X |
| 2,469,902 | 5/1949 | Stalker | 244—42 |
| 2,496,565 | 2/1950 | Stalker | 244—42 |
| 3,051,413 | 8/1962 | Pouit | 244—42 X |
| 3,179,357 | 4/1965 | Lyon | 244—44 |

MILTON BUCHLER, *Primary Examiner.*

A. E. CORRIGAN, *Assistant Examiner.*